(12) United States Patent
Zamfes

(10) Patent No.: US 7,533,560 B2
(45) Date of Patent: May 19, 2009

(54) HORIZONTAL BINOCULAR MICROSCOPE FOR VERTICALLY GRAVITATED AND FLOATING SAMPLES

(75) Inventor: Konstandinos Zamfes, Calgary (CA)

(73) Assignee: Canadian Logging Systems Corp., Calgary (CA)

( * ) Notice: Subject to any disclaimer, the term of this patent is extended or adjusted under 35 U.S.C. 154(b) by 35 days.

(21) Appl. No.: 10/711,435

(22) Filed: Sep. 17, 2004

(65) Prior Publication Data

US 2005/0063050 A1    Mar. 24, 2005

Related U.S. Application Data

(60) Provisional application No. 60/481,408, filed on Sep. 22, 2003.

(51) Int. Cl.
*G01N 11/00* (2006.01)

(52) U.S. Cl. .................. 73/54.15; 73/61.41; 435/9

(58) Field of Classification Search .............. 359/384, 359/368, 375–378; 248/124.1, 287.1; 494/16; 73/53.01–64.56, 863–864.91, 152.07, 152.09, 73/152.11; 435/9; 175/59; 436/25, 28–31
See application file for complete search history.

(56) References Cited

U.S. PATENT DOCUMENTS

| | | | | |
|---|---|---|---|---|
| 3,762,796 A | * | 10/1973 | Heller | 359/375 |
| 4,515,333 A | * | 5/1985 | Pugh et al. | 248/123.11 |
| 4,856,742 A | * | 8/1989 | Welsh | 248/124.1 |
| 5,163,649 A | * | 11/1992 | Schehr | 248/287.1 |
| 5,732,912 A | * | 3/1998 | Nomura et al. | 248/187.1 |
| 6,337,766 B1 | * | 1/2002 | Fujino | 359/383 |
| 6,666,067 B2 | * | 12/2003 | Stolper | 73/19.01 |
| 6,770,244 B2 | * | 8/2004 | Hool et al. | 422/72 |

OTHER PUBLICATIONS

U.S. Appl. No. 10/710,840, filed Aug. 5, 2004, Zamfes.

* cited by examiner

*Primary Examiner*—Alessandro Amari
(74) *Attorney, Agent, or Firm*—Diederiks & Whitelaw, PLC

(57) ABSTRACT

An apparatus and process for visual observation and measurement of aggregated, granular and floating or suspended particles samples, which are gravitationally separated is disclosed. The first part of apparatus is the horizontally focused binocular microscope with vertical positioning. The second part of the apparatus is the revolving test tube holder with vertical positioning and rubber ring for soft tube position fixing. The process is consisting in horizontal focusing on the visual sample analyzing it in liquid. The difference from conventional process of sample analyzing is that in vertical position the gravitationally separated fractions of the sample will be not disturbed during the analysis and study of the sample. This will make possible both to study the microgranulometry samples under horizontally focused binocular microscope and to use different liquids for gravitational separation of particles and granules without contaminating the environments and degrading working conditions.

3 Claims, 4 Drawing Sheets

Assembly for Changing the Focusing from Vertical to Horizontal

Side View

Top View

Vertical Test Tube Holding Assemble

Elastic Side Holder for verticaly Placed Test Tube

HORIZONTAL BINOCULAR MICROSCOPE FOR VERTICALLY GRAVITATED AND FLOATING SAMPLES

CROSS REFERENCE TO RELATED APPLICATIONS

This application claims the benefit of U.S. Provisional Patent Application Ser. No. 60/481,408, filed Sep. 22, 2003.

FIELD OF INVENTION

The invention is related to apparatus and process for visual analyses of gravitationally separated fractions of granular sample in liquid. This apparatus and process are necessary for micro-granulometry analyses that is main part of field and well site analyses of unconsolidated fractions of the formations in sub-strata. Obtaining the quantitative and qualitative degree of fractional separation of particles is beneficial for the physical and petrophysical analyses and formation log interpretation of the formation drilled for Oil and Gas or other targets.

BACKGROUND OF INVENTION

During drilling of a well the knowledge of micro-granulometrical properties of the unconsolidated formations is one of the primary information in Oil and Gas exploration. The gravitationally separated fractions are easily disturbed if the vertical position of sample is changed to horizontal. For proper Microgranulometry analysis it is necessary to position the sample in the tube and hold it firmly with capability of vertical movement, in front of the Horizontally Focusable Binocular Microscope. Conventionally some of the cutting analyses are done under the vertically focused binocular microscope with great difficulty and low quality. Especially difficult are to analyze the sands and silts within clay matrices and sandy and silty clays/shales. We disclose the ways to obtain the visual analysis of gravitationally separated fractions continuously in sample of varying granulometrical consistency.

SUMMARY OF INVENTION

Apparatus and process of this invention are provided for obtaining the horizontal focusing on binocular microscope and vertical holding of the gravitationally separated sample in the tube for visual analyses of separated fractions of particles without disturbing the sequences.

The vertical to horizontal change in focusing of binocular microscope is achieved by device on FIG. 2. This device is consisting of rotating in horizontal plain bushing 29, with horizontally rotating bar 26, both holding on vertical sliding bushing 25.

Apparatus on FIG. 1 achieves the vertical holding of test tube. The base of the device is vertical travel bar 113. The test tube holding plate 114 with the vertical guiding hole 115. The test tube is fixed by rubber ring 120, which is placed in holding groove 121 with slight tension.

The device consisting of vertical screw 111, which is moving the sliding vertical bushing 112 attached to the plate 114, achieves the vertical positioning of the test tube plate 114. The rotation of screw 111 is set by vertical movement handle 110.

DETAILED DESCRIPTION

Figure 2:
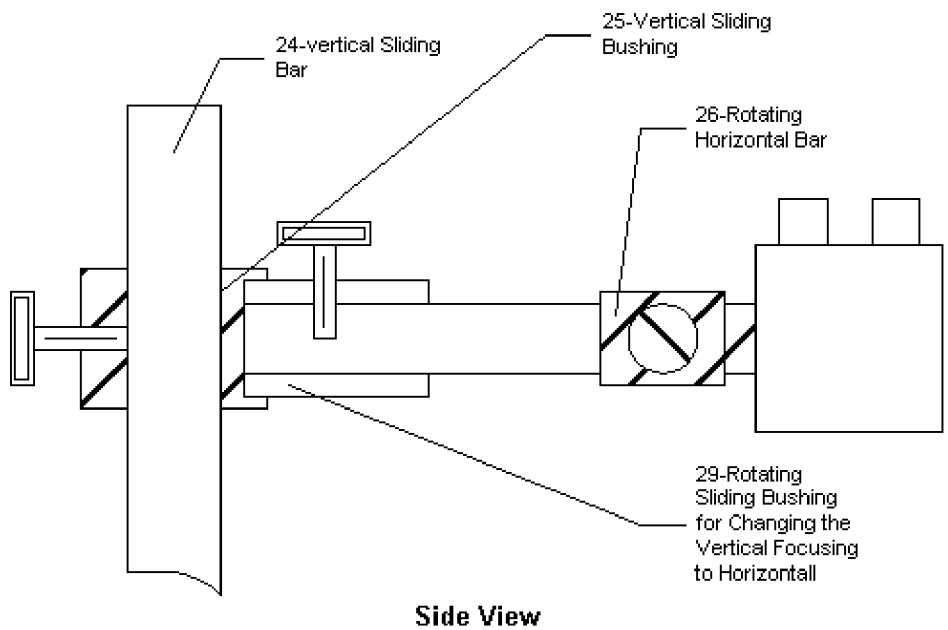
FIG. 2. is a schematic of Assembly for changing the vertical focusing to horizontal.
Figure 2:
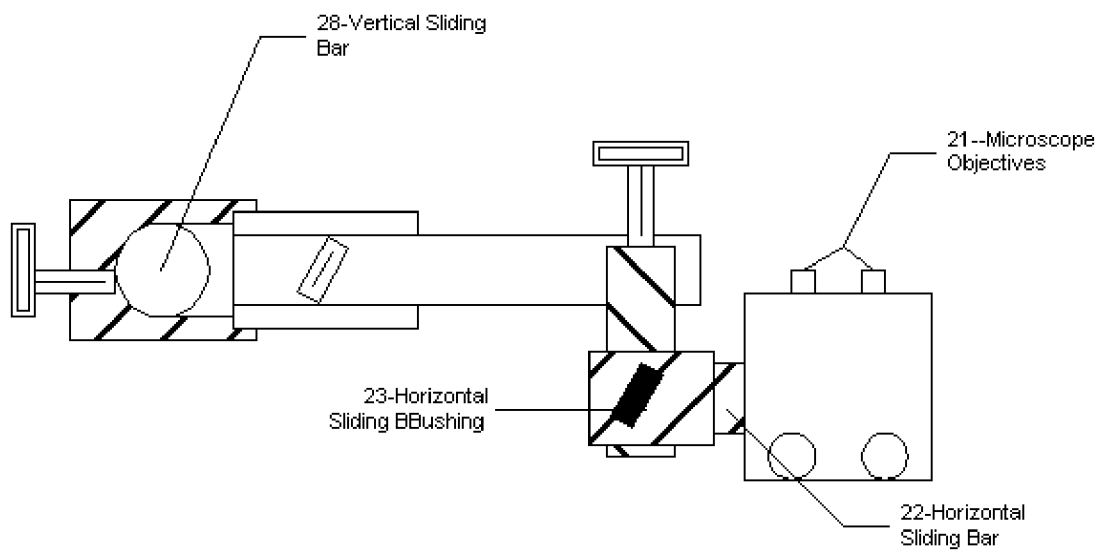
Figure 3:
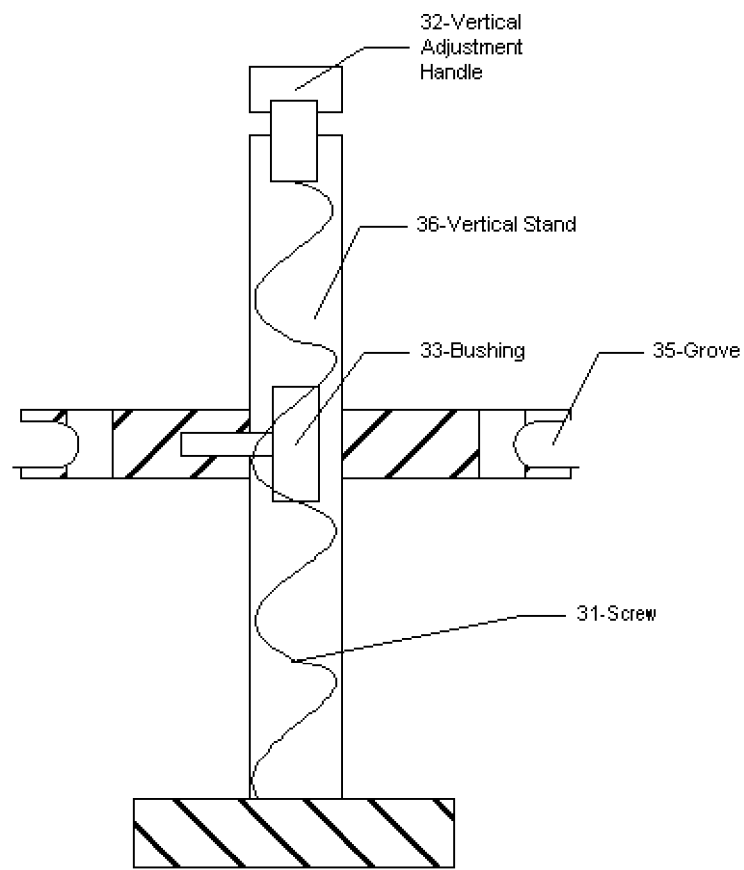
FIG. 3. is a schematic of Vertical test tube holding.
Figure 3:
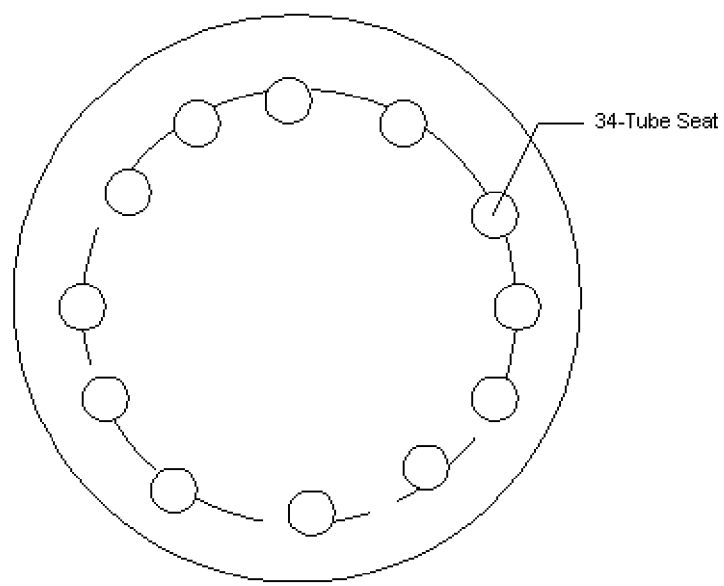
Figure 4:
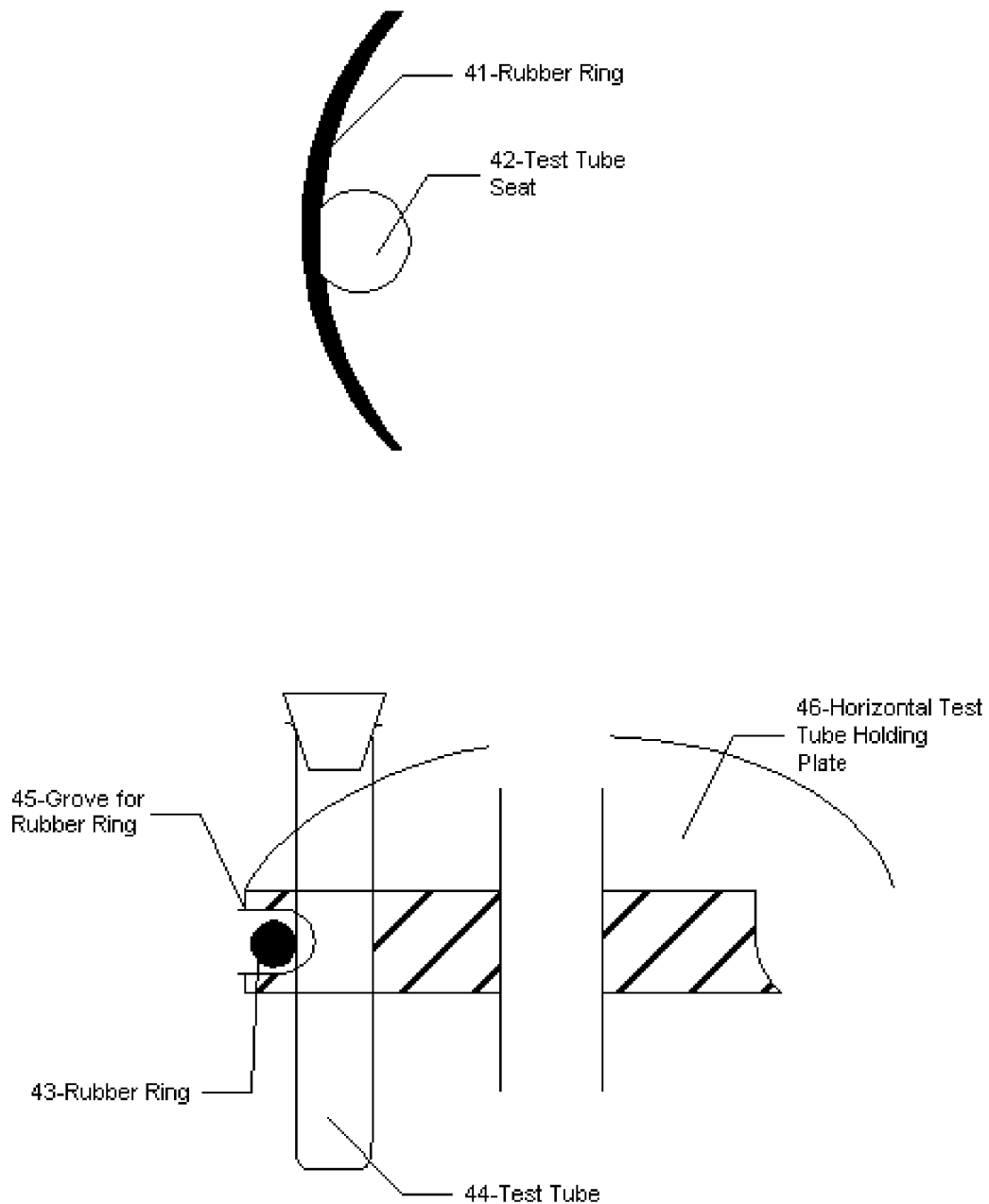
FIG. 4. is a schematic of Elastic side holder for vertically placed test tubes.

The apparatus consists of the stand for holding the binocular and stand for holding the test tubes. The process is consisting in visual analysis of gravitationally separated fractions of particles continuously, in sample of varying granulometrical consistency. Below are the detail description of the apparatus and process:

The vertical to horizontal change in focusing of binocular microscope is achieved by device on FIG. 2. This device is consisting of rotating in horizontal plain bushing 29, with horizontal rotating bar 26, both holding on vertical sliding bushing 25. This device is easily attachable to conventional binocular microscope and without space or time sacrificing completes the conversion.

Figure 1:
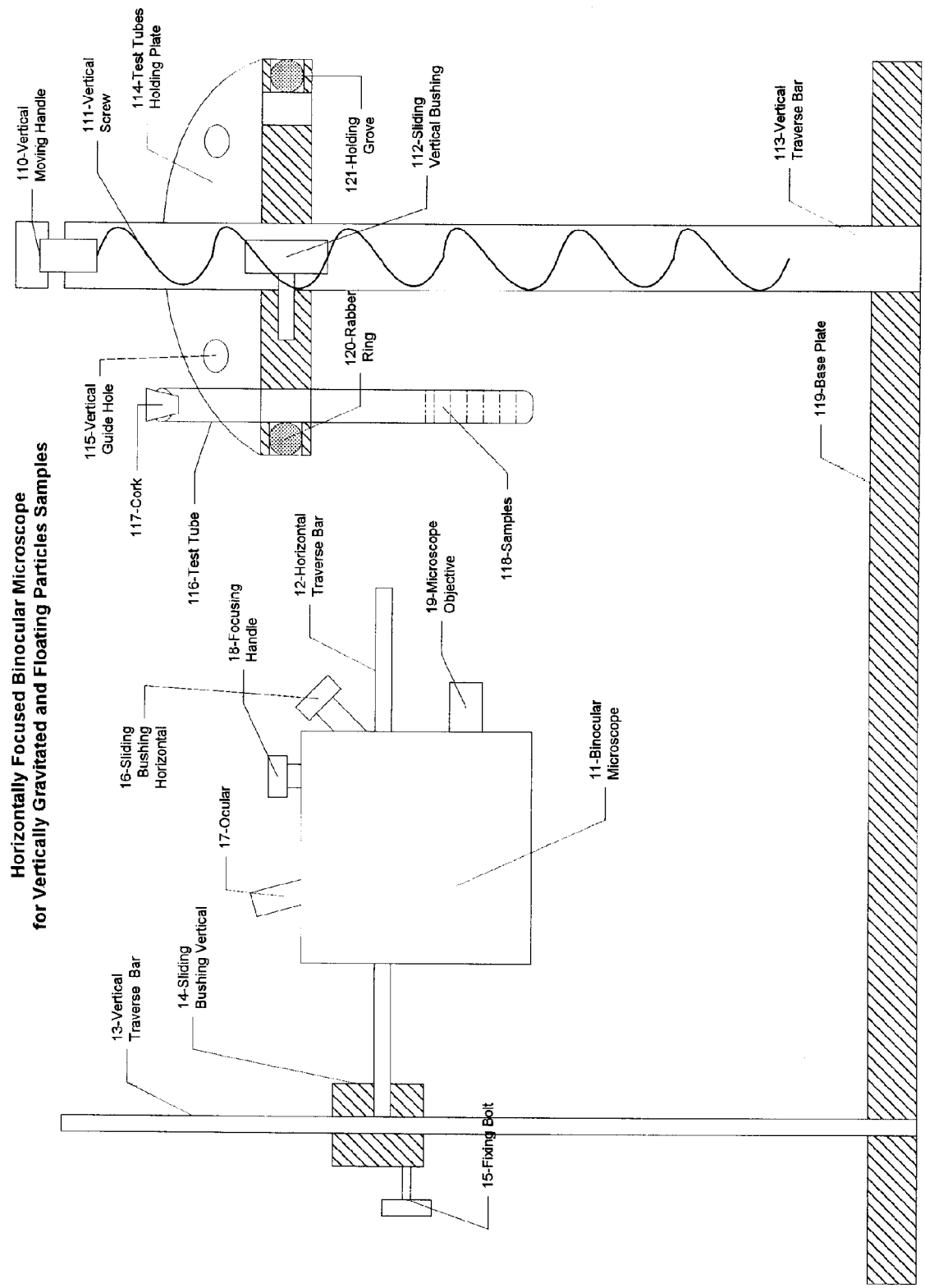
FIG. 1. is a schematic of horizontally focused binocular for vertically gravitated and floating particles samples.

Apparatus on FIG. 1 achieves the vertical holding of test tube. The base of the device is vertical travel bar 113. The test tube holding plate 114 with the vertical guiding hole 115. The test tube is fixed by rubber ring 120, which is placed in holding groove 121 with slight tension.

The vertical positioning of the test tube plate 114 is achieved by a device, consisting of a vertical screw 111 moving the sliding vertical bushing 112 attached to the plate 114. The rotation is set by vertical movement handle 110.

The process consists of horizontally focusing on the visual sample and analyzing it in liquid. The difference from conventional process of sample analyzing is that in vertical position the gravitationally separated fractions of the sample will be not disturbed during the analysis and study of the sample.

What is claimed is:

1. A process of analyzing a sample of gravitationally separated fractions, comprising:
   a) maintaining the sample in a vertical position;
   b) maintaining the sample in an undisturbed state to maintain the integrity of the gravitationally separated fractions;
   c) providing a horizontally focusing binocular microscope; and
   d) viewing the gravitationally separated fractions of the sample in a vertical and undisturbed state using the horizontally focusing binocular microscope.

2. The process of claim 1, further comprising providing a liquid for immersing the sample prior to viewing the gravitationally separated fractions of the sample, wherein viewing the gravitationally separated fractions of the sample occurs in the liquid.

3. The process of claim 1, wherein the sample comprises drilling cuttings obtained during the drilling of a well in oil and gas exploration.

* * * * *